(12) United States Patent
ElShenawy

(10) Patent No.: US 11,869,048 B2
(45) Date of Patent: Jan. 9, 2024

(54) USER RECOMMENDATIONS AND REVIEWS USING AUTONOMOUS VEHICLE INFORMATION

(71) Applicant: GM Cruise Holdings LLC, San Francisco, CA (US)

(72) Inventor: Mohamed Mostafa ElShenawy, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 869 days.

(21) Appl. No.: 16/439,015

(22) Filed: Jun. 12, 2019

(65) Prior Publication Data
US 2020/0394690 A1    Dec. 17, 2020

(51) Int. Cl.
*G06Q 30/0282*    (2023.01)
*G06Q 50/30*    (2012.01)
*G05D 1/00*    (2006.01)
*G06F 3/16*    (2006.01)

(52) U.S. Cl.
CPC ....... *G06Q 30/0282* (2013.01); *G05D 1/0088* (2013.01); *G06F 3/165* (2013.01); *G06Q 50/30* (2013.01); *G05D 2201/0213* (2013.01)

(58) Field of Classification Search
CPC ............... G06Q 30/0282; G06Q 50/30; G06Q 30/0631; G05D 2201/0213
See application file for complete search history.

(56) References Cited

U.S. PATENT DOCUMENTS

| 9,076,165 B2 * | 7/2015 | Busch | G06Q 30/0205 |
| 2008/0004944 A1 * | 1/2008 | Calabria | G06Q 30/0631 705/26.1 |

(Continued)

FOREIGN PATENT DOCUMENTS

WO    WO 2016/183525 A1    11/2016

OTHER PUBLICATIONS

D-H. Lee and C. Parsuvanathan, "Assessing passenger feedback reliability in crowd-sourced measurement of transit ride quality," 2017 IEEE 20th International Conference on Intelligent Transportation Systems (ITSC), 2017, pp. 726-731, doi: 10.1109/ITSC.2017.8317961 (Year: 2017).*

(Continued)

*Primary Examiner* — Gabrielle A McCormick
*Assistant Examiner* — Maame Ofori-Awuah
(74) *Attorney, Agent, or Firm* — Novak Druce Carroll LLP

(57) ABSTRACT

The subject disclosure provides techniques for enriching user reviews and providing improved user recommendations using data collected by autonomous vehicles (AVs). In some aspects, a process of the disclosed technology includes steps for receiving a ride request wherein the ride request specifies a pick-up location associated with a user identifier (ID), navigating an autonomous vehicle to the pick-up location to provide ride service for a user associated with the user ID, and receiving review information from the user, wherein the review information relates to a product or service consumed by the user. In some aspects, the process can also include steps for associating the review information with the user ID, and enriching the review information using trip information associated with the user ID. Systems and computer-readable media are also provided.

18 Claims, 5 Drawing Sheets

(56) References Cited

U.S. PATENT DOCUMENTS

| | | | |
|---|---|---|---|
| 2011/0218930 A1* | 9/2011 | Black | G06Q 30/0185 |
| | | | 705/347 |
| 2014/0114877 A1* | 4/2014 | Montano | G06Q 10/06398 |
| | | | 705/347 |
| 2018/0137593 A1* | 5/2018 | Djuric | G06Q 50/30 |
| 2018/0237027 A1 | 8/2018 | Lundsgaard | |
| 2018/0326997 A1* | 11/2018 | Sweeney | G01C 21/3415 |
| 2018/0365740 A1* | 12/2018 | Nix | B60W 50/08 |
| 2019/0064801 A1 | 2/2019 | Frazzoli et al. | |
| 2019/0073676 A1* | 3/2019 | Wang | G06Q 20/4016 |
| 2020/0125989 A1* | 4/2020 | Sucan | G05D 1/0276 |

OTHER PUBLICATIONS

International Search Report and Written Opinion for International Application No. PCT/US2019/068313, dated Mar. 27, 2020, 9 pages.

* cited by examiner

USER RECOMMENDATIONS AND REVIEWS USING AUTONOMOUS VEHICLE INFORMATION

BACKGROUND

1. Technical Field

The subject technology provides solutions for improving user reviews and in particular, for enriching user review data using location-based signals collected by an autonomous vehicle (AV).

2. Introduction

As internet and smartphone use continue to expand, an increasing number of services are offering platforms that enable users to create and publish business reviews. Typically, such services provide aggregated ratings, such as in a number of "stars," or a numeric score, that give some relativistic measure that viewers can use to compare businesses of a similar type. In a classic example, viewers may compare different restaurants based on an associated star ranking. Although such platforms encourage users to express their opinions about various products or businesses by writing reviews about them, there are limited ways to ensure authenticity of a given user's provided opinions.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
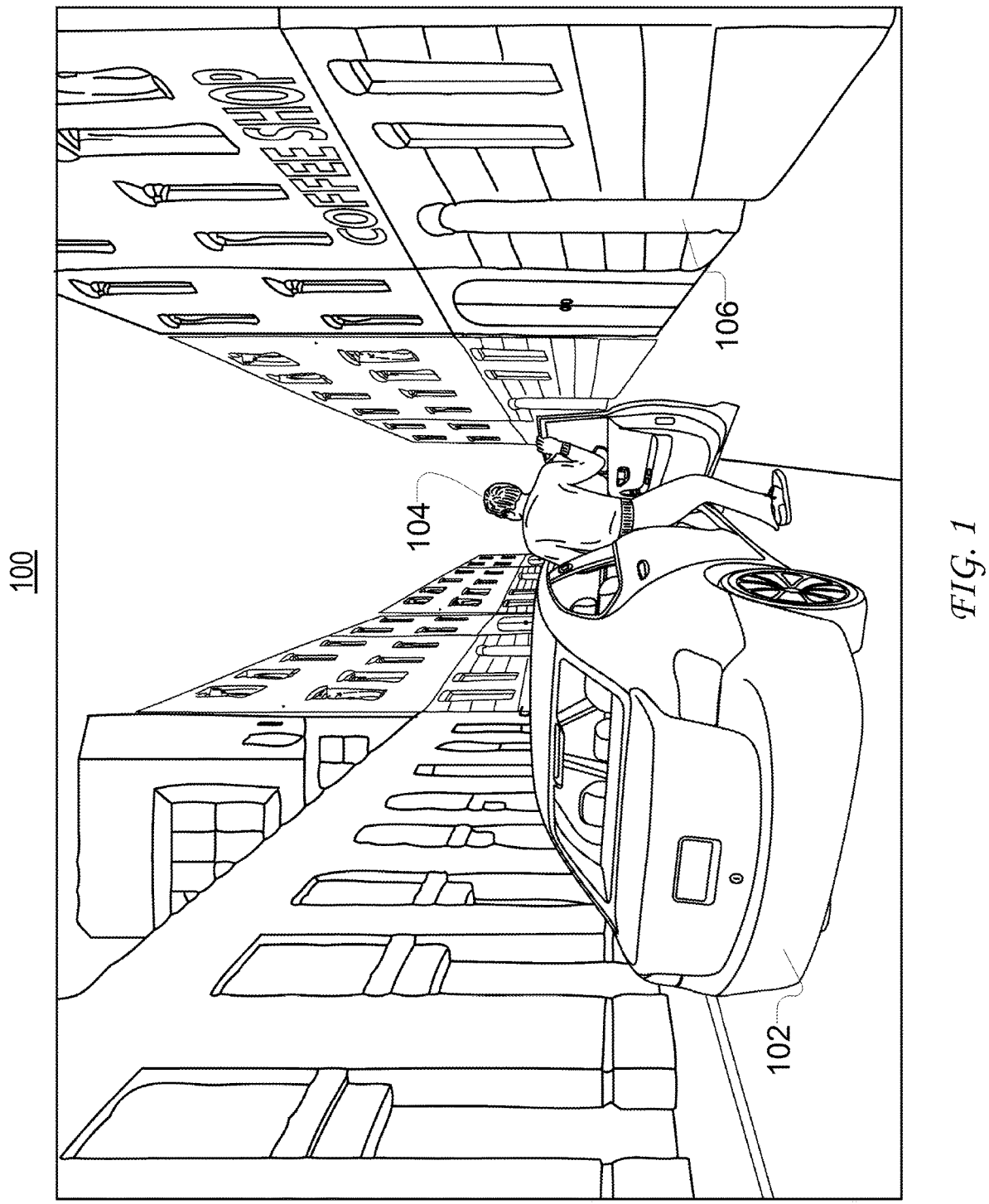
FIG. 1 illustrates an example environment in which some aspects of the disclosed technology can be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In conventional review platforms, the authenticity of user reviews is typically uncorroborated. For example, conventional review platforms do not provide any type of verification that a reviewing user actually consumed the products or services of a business that is the subject of the review. As such, users reading reviews often rely on other heuristics, such as a total number of reviews, as a proxy for judging review accuracy. For example, a composite rating for a restaurant with five-thousand total reviews may be considered more trustworthy than that for a restaurant with five reviews.

Conventional review platforms are also limited in their ability to perform collaborative filtering. For example, users consuming reviews must manually filter or discount reviews from users whose preferences appear to be different from their own. Such filtering is can be onerous for the searching user due to difficulty in ascertaining the preferences of the reviewing users. Additionally, conventional review platforms typically permit the submission and publication free-form user opinions, without providing guidance as to specific qualities or aspects that should be commented on. One downside of publishing free-form reviews is that different users rarely have the same tastes and preferences, making even genuine reviews less valuable to the general consuming public.

Aspects of the disclosed technology address the foregoing limitations of conventional review platforms by enriching user reviews using signals collected by autonomous vehicles (AVs). Aspects of the disclosed technology also provide improved solutions for soliciting review information, standardizing reviews between users, and providing recommendations, for example, in the form of destination recommendations.

As used herein, user reviews (also: review information) can include any user-generated content that relates to a business, product, and/or service consumed or otherwise experienced by the user. By way of non-limiting example, user reviews can include scores (e.g., numeric scores and/or star ratings) intended to communicate service and/or product quality, descriptions of services, products, places, and/or interactions with business employees or patrons, etc.

In some aspects, user location information collected by an AV can be used to enrich user review information by validating the review against known user location information, for example, using known pick-up and/or drop-off locations. As such, user location information can be used as a signal to improve review confidence or quality e.g., by confirming that a user was in the vicinity of a business associated with the review. As discussed in further detail below, location validation can help to improve aggregate review quality by mitigating fake reviews generated by persons or entities that never traveled to a location associated with the reviewed business.

In another aspect, the disclosed technology provides an improved review platform for eliciting and aggregating user review information. For example, the AV environment can be configured to elicit user opinions using audible (voice) prompts that simulate natural human conversation, especially that of small-talk that typically occurs between drivers and riders. As discussed in further detail below, by providing an improved user experience, the disclosed review and recommendation platform can be configured to elicit targeted user opinions, for example, pertaining to specific qualities or aspects of the reviewed products or services.

In yet another aspect, the disclosed technology includes a recommendation platform that can utilize user/rider profiles, e.g., that includes user trip and/or review information, to generate recommendations using improved collaborative filtering techniques. For example, using rider profiles (e.g., including user reviews and ride histories), the recommendation platform can automatically identify similarities between users, and make targeted suggestions (e.g., destination recommendations) based on up-to-date comparisons across rider cohorts.

FIG. 1 illustrates an example environment 100 in which some aspects of the disclosed technology can be implemented. Environment 100 includes an autonomous vehicle (AV) 102 shown responding to a ride request by user 104. Depending on the desired implementation, user 104 can hail AV 102 by sending a ride request from a client device (e.g., a smart phone or other mobile computing device) to an AV dispatch system (not illustrated). The dispatch system can then provide a pick-up location for the ride request to a computing system of AV 102, causing AV 102 to navigate to the pick-up location associated with the user. In some aspects, user 104 can be associated with a unique rider profile that includes a user identifier (ID) that distinguishes user 104 from other riders of the same ride service.

In the example of environment 100, the pick-up location is proximate to business 106 (e.g., a coffee shop) visited by user 104 prior to ride service pick-up. Based on the proximity of the pick-up location to business 106, trip information associated with user 104 can be enriched to reflect a possible association between user 104 and business 106. As used herein, trip information can include any information or metadata relating to a ride taken by a user. By way of example, trip information can include pick-up (origination) information, drop-off (destination) information, route path information, user reviews or preferences provided by a rider during the course of a trip, and/or that relate to a trip, etc. As discussed in further detail below, trip information for one or more trips can be used to create and/or update a rider profile that is associated with user 104. Additionally, trip information, in particular pick-up location information, can be used to validate reviews provided by the user/rider. By enriching (validating) user reviews with location-based information collected by the AV, the veracity of user reviews can be improved by mitigating potentially fake reviews from users whose proximity to the reviewed business cannot be verified.

Figure 2:
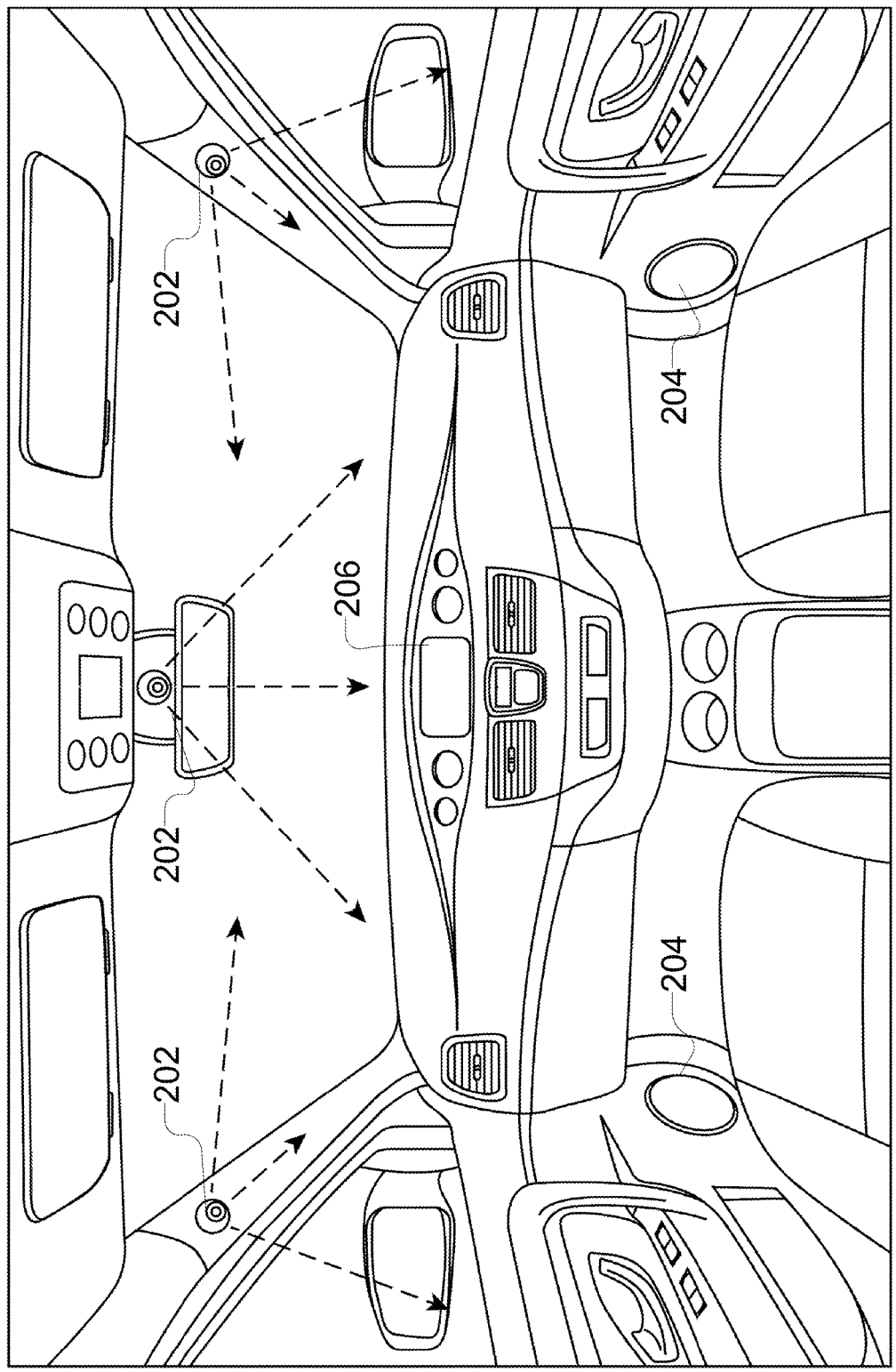
FIG. 2 illustrates an example of an interior autonomous vehicle (AV) environment in which some aspects of the disclosed technology can be implemented.

FIG. 2 illustrates an example of an autonomous vehicle (AV) environment 200 in which some aspects of the disclosed technology can be implemented. Autonomous vehicle environment 200 includes the interior of AV 102 experienced by user 104 following pick-up from business 106. Environment 200 is configured to facilitate seamless information exchange between user 104 and AV 102. For example, multiple interior cameras 202 enable AV 102 to collect video and audio information relating to the user. Additionally, speakers 204 and display 206 facilitate communications from AV 102 to user 104. It is understood that environment 200 represents a simplified example of the interior of AV 102, and that other types of computing systems and communication equipment (not illustrated) can be implemented to perform the functionality described herein. By way of example, some (or all) of the interactive functionality of AV 102 may be supported by one or more remote computing systems in wireless communication with various computing and/or navigation systems of AV 102. Furthermore, it is understood that environment 200 can include additional (or fewer) video, audio and/or display devices, without departing from the scope of the disclosed technology.

In practice, cameras 202 and speakers 204 can be used to communicate with user/rider 104, for example, to elicit and collect review information regarding one or more of a business, product, and/or service that has been consumed or experienced by user 104. By way of example, upon entry into environment 200, cameras 202 can be used to collect video and/or audio information that can be used to perform sentiment analysis, i.e., to infer an emotional state of the rider.

In some aspects, environment 200 can be used to provide prompts to the user in order to elicit specific information regarding a business, service or product. Prompts can be communicated to the user via any available means, such as through communication with the user via an application on his/her mobile device, or via one or more displays and/or speakers native to environment 200. By way of example, speakers 204 and/or display 206 can be used to deliver audible and/or visual prompts that provide context-driven, queries to the user. In some approaches, audible prompts can mimic colloquial human conversation, such as by asking questions regarding the rider's trip or activities before a time of pick-up. Prompts can be formulated using rider profile information associated with the user. By way of example, trip information pertaining to an immediate trip being taken by the user can be used to formulate questions, e.g., based on the pick-up location. Further to the above example in FIG. 1, rider/user 104 may be provided with the query: "How was the wait time at the coffee shop?"

In other aspects, formulation of user prompts can be based on past review information provided by the user, and associated with the user's (rider) profile. For example, if the user has been known to provide specific reviews regarding lattes, rider/user 104 may be provided with the audible query: "Did you try the latte at the coffee shop?" In some approaches, prompts can be spread over multiple follow-up questions. Additionally, in some aspects, other user/rider reviews may be used to inform the formulation of a prompt. As discussed in further detail below, additional rider profiles and/or review information provided by one or more third-party systems, can be used to generate contextual queries to prompt the user to provide specific information or details that can be used to enrich existing reviews.

In yet another aspect, environment 200 can be used to provide rider/user suggestions or recommendations. Rider recommendations can be based on the rider's profile and/or the profile of similar users of the ride service. In some implementations, similarity between riders can be determined based on rider profile information, wherein rider profiles can be clustered to identify similar users based on characteristics shared by their historic trip information, such as, routes taken, pick-up locations, drop-off locations, similarities between businesses/establishments visited, and/or similarities between provided user reviews, etc. By identifying similar users based on their respective travel patterns (e.g., trip information) the disclosed technology improves upon conventional collaborative filtering methods, enabling more highly targeted recommendations to be provided between (more highly) similar users.

Figure 3:
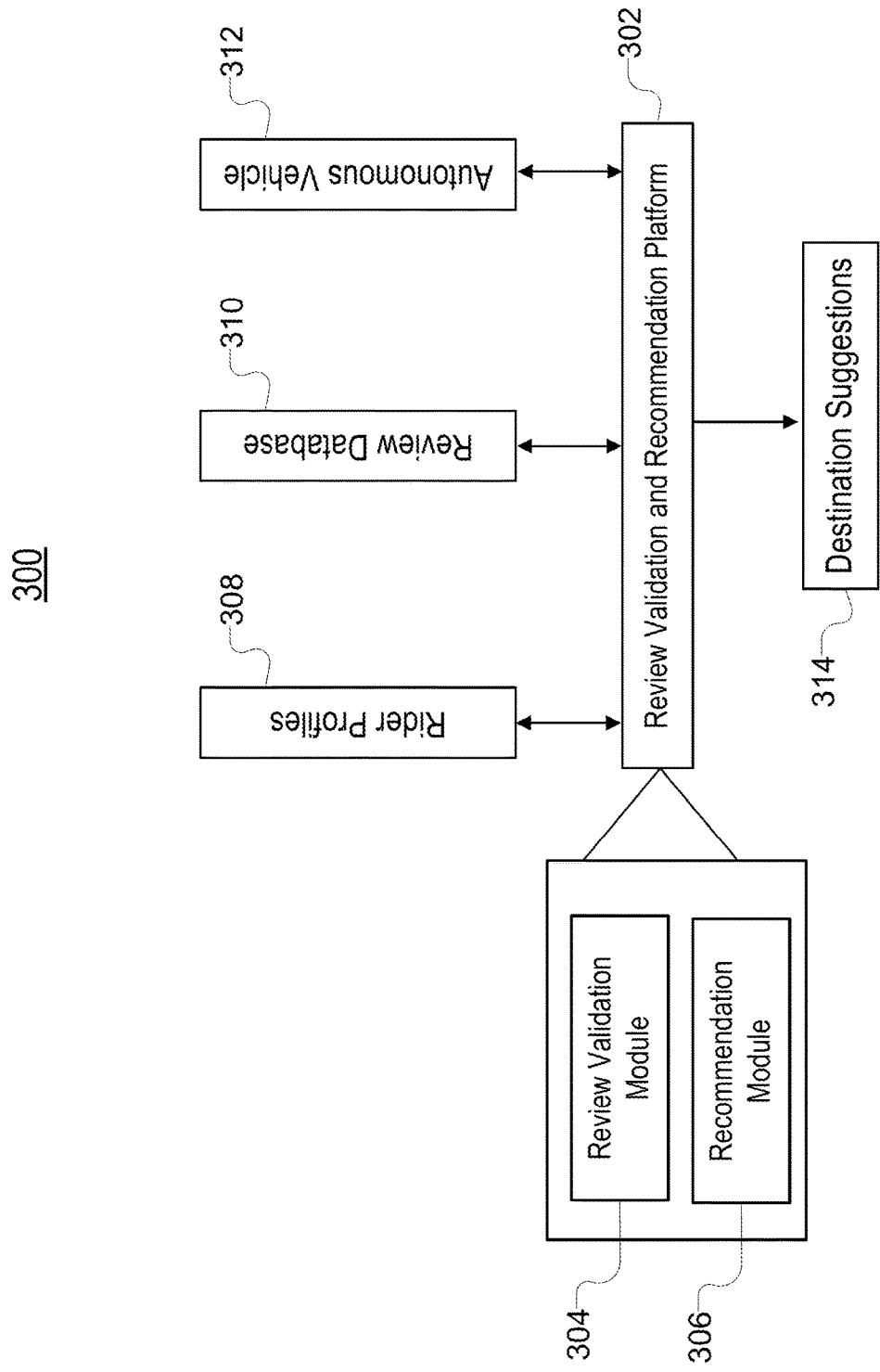
FIG. 3 illustrates an example of a review/recommendation system that can be configured to validate user reviews and provide destination recommendations, according to some aspects of the disclosed technology.

FIG. 3 conceptually illustrates a review validation and recommendation system 300 that can be configured to validate user reviews and provide improved rider recommendations, according to some aspects of the disclosed technology. Although system 300 is shown in simplified block form, it is understood that the system can be implemented using a variety of hardware and software systems, including distributed computing systems and/or functions instantiated as virtual entities in a cloud platform. For example, any of the functions necessary to provide ride services, dispatch, navigation, and collection of user review information, can be performed by systems distributed across one or more remote, cloud, and/or AV computing systems. As such, various systems used to implement platform 300 can be in communication over one or more data networks, including but not limited to wired and/or wireless public or private Local Area Networks (LANs), Wide Area Networks (WANs), or a network of networks, such as the internet.

System 300 includes a review/recommendation platform 302 that includes a review validation module 302, and a recommendation module 306. Platform 302 is configured to exchange data with various databases, modules, and third-party systems. As illustrated, platform 304 is configured to exchange data with a rider profile database 308, a review database 310, and AV 312. In turn, platform 304 is configured to perform data aggregation and processing necessary to generate and output destination suggestions 314.

In practice, trip information pertaining to various user rides is collected by AV 312, and provided to platform 302, e.g., via a wireless communication system of AV 312. As discussed above, trip information can include route information, such as pick-up location information, drop-off location information, and/or a route taken. Additionally, trip information can include review information volunteered by a rider/user, or that was received in response to a prompt from AV 312. In some aspects, trip information is associated with a user ID that uniquely identifies an associated rider so that the trip information can be matched to the rider's profile, for example, and stored in rider profile database 308.

In some implementations, rider review information is parsed and stored in a separate database i.e., review database 310. However, in other implementations, review database 310 can represent one or more third-party databases or review platforms from which review information is received by platform 302. By way of example, pre-existing review content residing on a third-party server may be retrieved by platform 302, e.g., using an application programming interface (API), and then enriched using trip information collected and provided by AV 312. As described herein, third-party systems can include any devices or databases capable of providing user review information and/or sentiment information in relation to any business, product, or service. By way of non-limiting example, third-party systems may include, but are not limited to: review services, social networks, travel services, and/or map services, etc.

Review enrichment performed by platform 302 is facilitated review validation module 304. In operation, validation module 304 is configured to analyze rider location histories e.g., based on trip information, and rider review information to determine if the reviews can be authenticated. By way of example, if a user/rider is known to have been in the vicinity of a business associated with his/her review, the review may be authenticated. However, if the rider's proximity to the business associated with the review cannot be confirmed, or if the rider is known to have been at a different location during a timeframe of the review, then the review may fail authentication. In this manner, trip information (e.g., pick-up, drop-off and/or route information) can be used to enrich rider reviews by providing way to confirm review authenticity.

Further to the example above with respect to FIG. 1, trip information for user 104 would indicate a pick-up location proximate to business 106, a coffee shop. As such, if solicited for review information by AV 102, review information provided by user 104 and pertaining to business 106 would be validated based on the known pick-up location. In this way, review information provided by user 104 can be enriched using location information collected by AV 102. However, review information provided by user 104 relating to a business, product or service known to be outside a reasonable proximity to the pick-up location may fail validation. Failures of review validation can be treated differently, depending on the desired implementation; for example, un-validated reviews may be given less weight when rider recommendations are formulated by recommendation module 306. Alternatively, un-validated reviews may be omitted from storage in a review database, such as review database 310.

As discussed above, rider recommendations can be provided as destination suggestions 314, for example, that are based on trip history information associated with a rider's profile and/or rider profiles of similar users. In one or more aspects, the rider recommendations are derived from improved collaborative filtering techniques that are based on one or more of: review information pertaining to particular businesses, pick-up location history, drop-off location history, frequency of rideshare requests, time of rideshare requests, personal preferences, or the like that are associated with one or more user profiles. In some aspects, recommendations can be delivered at the AV, such as in environment 200, discussed above. For example, recommendations can be provided as audible messages that are intended to mimic the advice or recommendation of a human driver. Alternatively, recommendations can be displayed on a display device, such as display 206 in environment 200. In yet another implementation, destination recommendations may be pushed by platform 302 to a client device (e.g., a smartphone, or tablet computer, etc.) that is associated with the rider/user.

In some aspects, destination recommendations can be based on known traffic conditions, or wait times at various businesses. As such, recommendation module 306 may ingest a variety of signals (e.g., rider profile information, third-party review information, traffic information, etc.) to generate and provide targeted destination recommendations. The destination recommendations may be accompanied by automatically generated discount coupons or other business-specific content. In one or more aspects, in response to receiving a request to travel to the recommended destination, the platform 302 can transmit a request to a business associated with the destination, in advance of arrival, to place a reservation, purchase a ticket, or the like. In some aspects, recommendation module 306 can be updated based on user provided feedback regarding recommendation value or accuracy. As such, recommendation module 306 can evolve to provide more accurate recommendations for each rider/user of platform 302.

Figure 4:
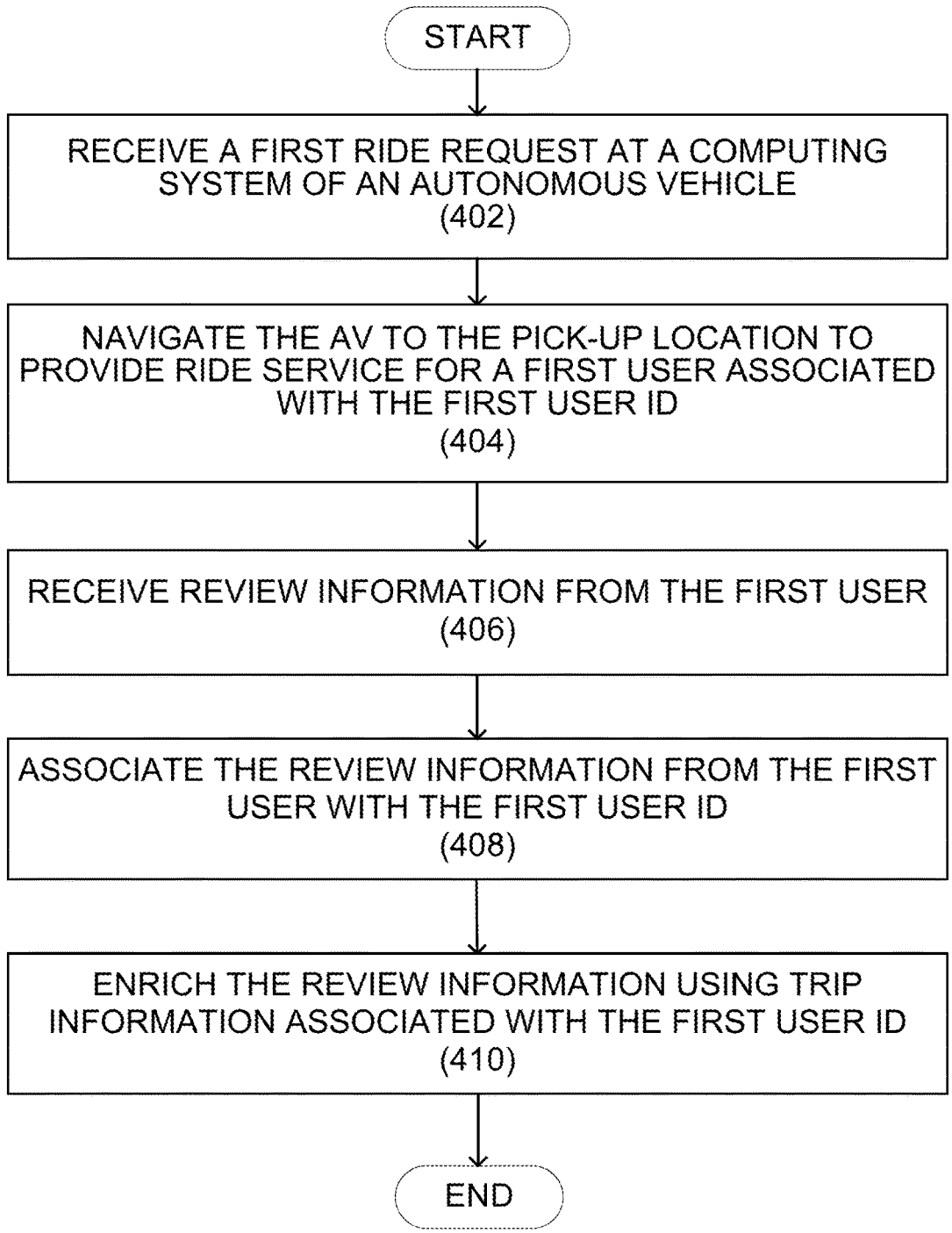
FIG. 4 illustrates an example process for validating user reviews, according to some aspects of the disclosed technology.

FIG. 4 illustrates an example process 400 for validating user reviews, according to some aspects of the disclosed technology. Process 400 begins with step 402 in which a ride request is received, e.g., at a computing system of an autonomous vehicle (AV). In some aspects, the ride request may be relayed from a client device of the requesting rider, via a dispatch system, and to the AV computing system. The ride request includes information specifying a pick-up location associated with requesting rider. In some aspects, the rider/user may be identified by a unique identifier (user ID) contained in the request.

In step 404, the ride request causes the receiving AV to navigate to the specified pick-up location. As discussed above, driving and navigation functions can be performed by one or more systems resident on the AV and/or that are distributed across remote systems in wireless communication with the AV. Upon arriving that the pick-up location, an identify of the rider is authenticated, and he/she is admitted into the AV.

In step 406, review information is received, by the AV, from the rider/user, wherein the review information relates to a product or service consumed by the user. As discussed above, review information can be received in response to a prompt provided by the AV, such as a visual or audible prompt. However, in other aspects, the review information may be gleaned from interactions between the user and one or more systems in the AV environment. As such, transfer of review information from the user to the AV can be accomplished in a transparent and seamless manner, providing the user with a smooth user experience.

In step 408, the review information is associated with a rider profile and/or user ID of the user. In some aspects, the review information is transferred to, or shared among, one or more remote systems, (e.g., platform 302, discussed above), for association with the rider's profile. Depending on implementation, a user ID can be used to associate review information provided by the user with his/her rider profile.

In step 410, the review information is enriched using trip information associated with the first user. As discussed above, in some aspects, pick-up location information can be used to corroborate/validate the review information received from the user/rider. That is, trip information associated with a user (e.g., the rider's profile or user ID), can be used to verify that a business associated with the product or service consumed by the user is in a geographic vicinity of a drop-off location associated with the ride request.

Figure 5:
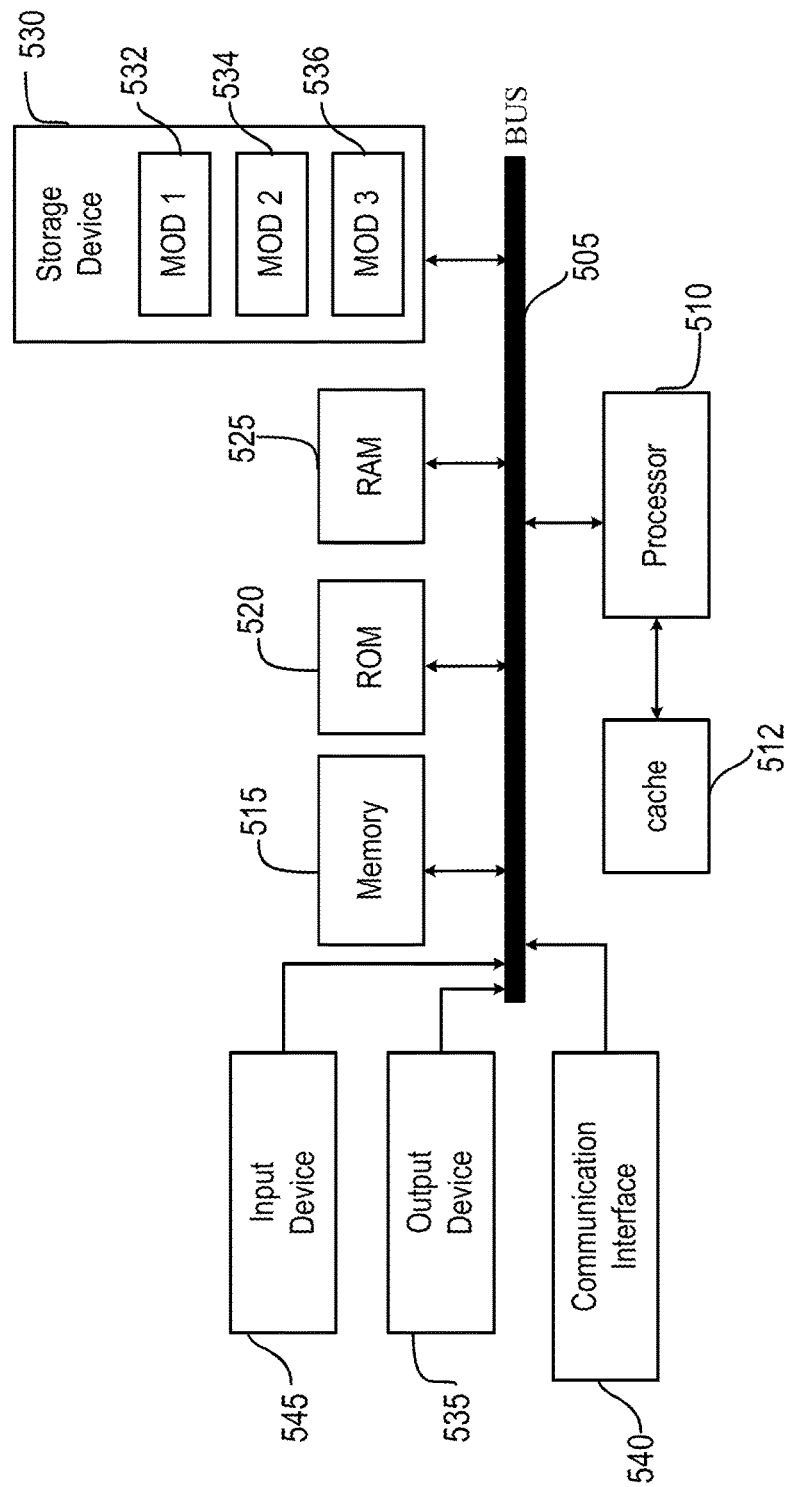
FIG. 5 illustrates an example processor-based system with which some aspects of the disclosed technology can be implemented.

FIG. 5 illustrates an example processor-based system with which some aspects of the subject technology can be implemented. Specifically, FIG. 5 illustrates system architecture 500 wherein the components of the system are in electrical communication with each other using a bus 505. System architecture 500 can include a processing unit (CPU or processor) 510, as well as a cache 512, that are variously coupled to system bus 505. Bus 505 couples various system components including system memory 515, (e.g., read only memory (ROM) 520 and random access memory (RAM) 525, to processor 510.

System architecture 500 can include a cache of high-speed memory connected directly with, in close proximity to, or integrated as part of the processor 510. System architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. Memory 515 can include multiple different types of memory with different performance characteristics. Processor 510 can include any general purpose processor and a hardware module or software module, such as module 1 (532), module 2 (534), and module 3 (536) stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms. In some instances, multimodal systems can enable a user to provide multiple types of input to communicate with the computing system architecture 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include software modules 532, 534, 536, for controlling processor 510. Other hardware or software modules are contemplated. Storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out various functions of the disclosed technology.

By way of example, instruction stored on computer-readable media can be configured to cause one or more processors to perform operations including: receiving a first ride request, at a computing system of an autonomous vehicle (AV), wherein the first ride request specifies a pick-up location associated with a first user identifier (ID); navigating the AV to the pick-up location to provide ride service for a first user associated with the first user ID; receiving review information from the first user, wherein the review information relates to a product or service consumed by the first user; associating the review information from the first user with the first user ID; and enriching the review information using trip information associated with the first user ID.

In some aspects, enriching the review information further comprises: verifying that a business associated with the product or service consumed by the user is in a geographic vicinity of a drop-off location associated with the ride request. In some aspects, collecting the review information from the user, further comprises: providing, by the computing system of an autonomous vehicle (AV), an audio prompt to the user, wherein the audio prompt is configured to elicit the review information from the user, and wherein the review information identifies a business associated with the product or service consumed by the user.

In some aspects, collecting the review information from the user further comprises: providing a prompt to a client device associated with the user ID, wherein the prompt is configured to elicit the review information from the user, and wherein the review information identifies a business associated with the product or service consumed by the user. In some aspects, the trip information comprises ride history information associated with the first user.

In some aspects, the processors can be further configured to execute instructions including: receiving a second ride request, at the computing system of the autonomous vehicle (AV), wherein the second ride request specifies a pick-up location associated with a second user identifier (ID); navigating the AV to the pick-up location to provide ride service for a second user; providing a destination recommendation to the second user, wherein the destination recommendation is based on ride history information for the second user and the review information from the first user. In some aspects, the destination recommendation is based on a comparison of a rider profile associated with the first user ID, and a rider profile associated with the second user ID.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method, comprising:
   receiving a first ride request, at a computing system of an autonomous vehicle (AV), wherein the first ride request specifies a pick-up location associated with a first user identifier (ID);
   navigating the AV, by the computing system of the AV, to the pick-up location to provide ride service for a first user associated with the first user ID;
   collecting location information, by the AV, related to one or more businesses proximate to the pick-up location;
   receiving, by the computing system of the AV, review information from the first user, wherein the review information relates to a product or service associated with a business consumed by the first user;
   associating, by the computing system of the AV, the review information from the first user with the first user ID and the pick-up location;
   sending, by the computing system of the AV, the review information associated with the first user ID and the pick-up location to a review validation platform;
   verifying, by the review validation platform, that the business associated with the product or service consumed by the user is in a geographic vicinity of the pick-up location associated with the ride request based on the location information collected by the AV;
   enriching, by the review validation platform, the review information using trip information associated with the first user when the product or service consumed by the user was in the geographic vicinity of the pick-up location associated with the ride request; and
   sending, by the review validation platform, the review information enriched by the review validation platform to a review database, wherein the review information sent to the review database can be accessed by other users.

2. The computer-implemented method of claim 1, further comprising:
   generating, by the computing system of the autonomous vehicle (AV), customized prompts for the first user, wherein the customized prompts are generated according to user profile information associated with the first user, and wherein the user profile information contains data pertaining to historic review information of the first user;
   providing, by the computing system of the AV, an audio prompt from the customized prompts to the user, wherein the audio prompt is configured to elicit additional review information from the user; and
   when the additional review information identifies the business associated with the product or service consumed by the user, enriching the review information with a portion of the additional review information.

3. The computer-implemented method of claim 2, further comprising:
formulating a prompt from the customized prompts; and
providing the prompt to the user, wherein the prompt is configured to elicit the review information from the user, and wherein the review information identifies a business associated with the product or service consumed by the user.

4. The computer-implemented method of claim 1, wherein the trip information comprises ride history information associated with the first user.

5. The computer-implemented method of claim 1, further comprising:
receiving a second ride request, at the computing system of the autonomous vehicle (AV), wherein the second ride request specifies a pick-up location associated with a second user identifier (ID);
navigating the AV to the pick-up location to provide ride service for a second user;
providing a destination recommendation to the second user, wherein the destination recommendation is based on ride history information for the second user and the review information from the first user.

6. The computer-implemented method of claim 5, wherein the destination recommendation is based on a comparison of a rider profile associated with the first user ID, and
a rider profile associated with the second user ID.

7. The computer-implemented method of claim 1, further comprising:
receiving additional review information from the user through an interface in a cabin of an autonomous vehicle, the additional review information identifies the business associated with the product or service consumed by the user, enriching the review information with a portion of the additional review information.

8. A system for enriching user reviews, comprising:
one or more processors; and
a computer-readable medium comprising instructions stored therein, which when executed by the processors, cause the processors to perform operations comprising:
receiving a first ride request, at a computing system of an autonomous vehicle (AV), wherein the first ride request specifies a pick-up location associated with a first user identifier (ID);
navigating the AV, by the computing system of the AV, to the pick-up location to provide ride service for a first user associated with the first user ID;
collecting location information, by the AV, related to one or more businesses proximate to the pick-up location;
receiving, by the computing system of the AV, review information from the first user, wherein the review information relates to a product or service associated with a business consumed by the first user;
associating, by the computing system of the AV, the review information from the first user with the first user ID and the pick-up location;
sending, by the computing system of the AV, the review information associated with the first user ID and the pick-up location to a review validation platform;
verifying, by the review validation platform, that the business associated with the product or service consumed by the user is in a geographic vicinity of the pick-up location associated with the ride request based on the location information collected by the AV;
enriching, by the review validation platform, the review information using trip information associated with the first user when the product or service consumed by the user was in the geographic vicinity of the pick-up location associated with the ride request; and
sending, by the review validation platform, the review information enriched by the review validation platform to a review database, wherein the review information sent to the review database can be accessed by other users.

9. The system of claim 8, wherein the instructions further cause the processors to perform operations comprising:
generating, by the computing system of the autonomous vehicle (AV), customized prompts for the first user, wherein the customized prompts are generated according to user profile information associated with the first user, and wherein the user profile information contains data pertaining to historic review information of the first user;
providing, by the computing system of the AV, an audio prompt from the customized prompts to the user, wherein the audio prompt is configured to elicit additional review information from the user; and
when the additional review information identifies the business associated with the product or service consumed by the user, enriching the review information with a portion of the additional review information.

10. The system of claim 9, wherein the instructions further cause the processors to perform operations comprising:
formulating a prompt from the customized prompts; and
providing the prompt to the user, wherein the prompt is configured to elicit the review information from the user, and wherein the review information identifies a business associated with the product or service consumed by the user.

11. The system of claim 8, the trip information comprises ride history information associated with the first user.

12. The system of claim 8, wherein the processors are further configured to execute instructions comprising:
receiving a second ride request, at the computing system of the autonomous vehicle (AV), wherein the second ride request specifies a pick-up location associated with a second user identifier (ID);
navigating the AV to the pick-up location to provide ride service for a second user;
providing a destination recommendation to the second user, wherein the destination recommendation is based on ride history information for the second user and the review information from the first user.

13. The system of claim 12, wherein the destination recommendation is based on a comparison of a rider profile associated with the first user ID, and a rider profile associated with the second user ID.

14. A non-transitory computer-readable storage medium comprising instructions stored therein, which when executed by one or more processors, cause the processors to perform operations comprising:
receiving a first ride request, at a computing system of an autonomous vehicle (AV), wherein the first ride request specifies a pick-up location associated with a first user identifier (ID);
navigating the AV, by the computing system of the AV, to the pick-up location to provide ride service for a first user associated with the first user ID;
collecting location information, by the AV, related to one or more businesses proximate to the pick-up location;
receiving, by the computing system of the AV, review information from the first user, wherein the review information relates to a product or service associated with a business consumed by the first user;

associating, by the computing system of the AV, the review information from the first user with the first user ID and the pick-up location;

sending, by the computing system of the AV, the review information associated with the first user ID and the pick-up location to a review validation platform;

verifying, by the review validation platform, that the business associated with the product or service consumed by the user is in a geographic vicinity of the pick-up location associated with the ride request based on the location information collected by the AV;

enriching, by the review validation platform, the review information using trip information associated with the first user when the product or service consumed by the user was in the geographic vicinity of the pick-up location associated with the ride request; and sending, by the review validation platform, the review information enriched by the review validation platform to a review database, wherein the review information sent to the review database can be accessed by other users.

15. The non-transitory computer-readable storage medium of claim 14, wherein the instructions further cause the processors to perform operations comprising:

generating, by the computing system of the autonomous vehicle (AV), customized prompts for the first user, wherein the customized prompts are generated according to user profile information associated with the first user, and wherein the user profile information contains data pertaining to historic review information of the first user;

providing, by the computing system of the AV, an audio prompt from the customized prompts to the user, wherein the audio prompt is configured to elicit additional review information from the user; and when the additional review information identifies the business associated with the product or service consumed by the user, enriching the review information with a portion of the additional review information.

16. The non-transitory computer-readable storage medium of claim 15, wherein the instructions further cause the processors to perform operations comprising:

formulating a prompt from the customized prompts; and providing the prompt to a client device associated with the user, wherein the prompt is configured to elicit the review information from the user, and wherein the review information identifies a business associated with the product or service consumed by the user.

17. The non-transitory computer-readable storage medium of claim 14, the trip information comprises ride history information associated with the first user.

18. The non-transitory computer-readable storage medium of claim 14, the instructions further comprising:

receiving a second ride request, at the computing system of the autonomous vehicle (AV), wherein the second ride request specifies a pick-up location associated with a second user identifier (ID);

navigating the AV to the pick-up location to provide ride service for a second user;

providing a destination recommendation to the second user, wherein the destination recommendation is based on ride history information for the second user and the review information from the first user.

* * * * *